Patented Nov. 25, 1941

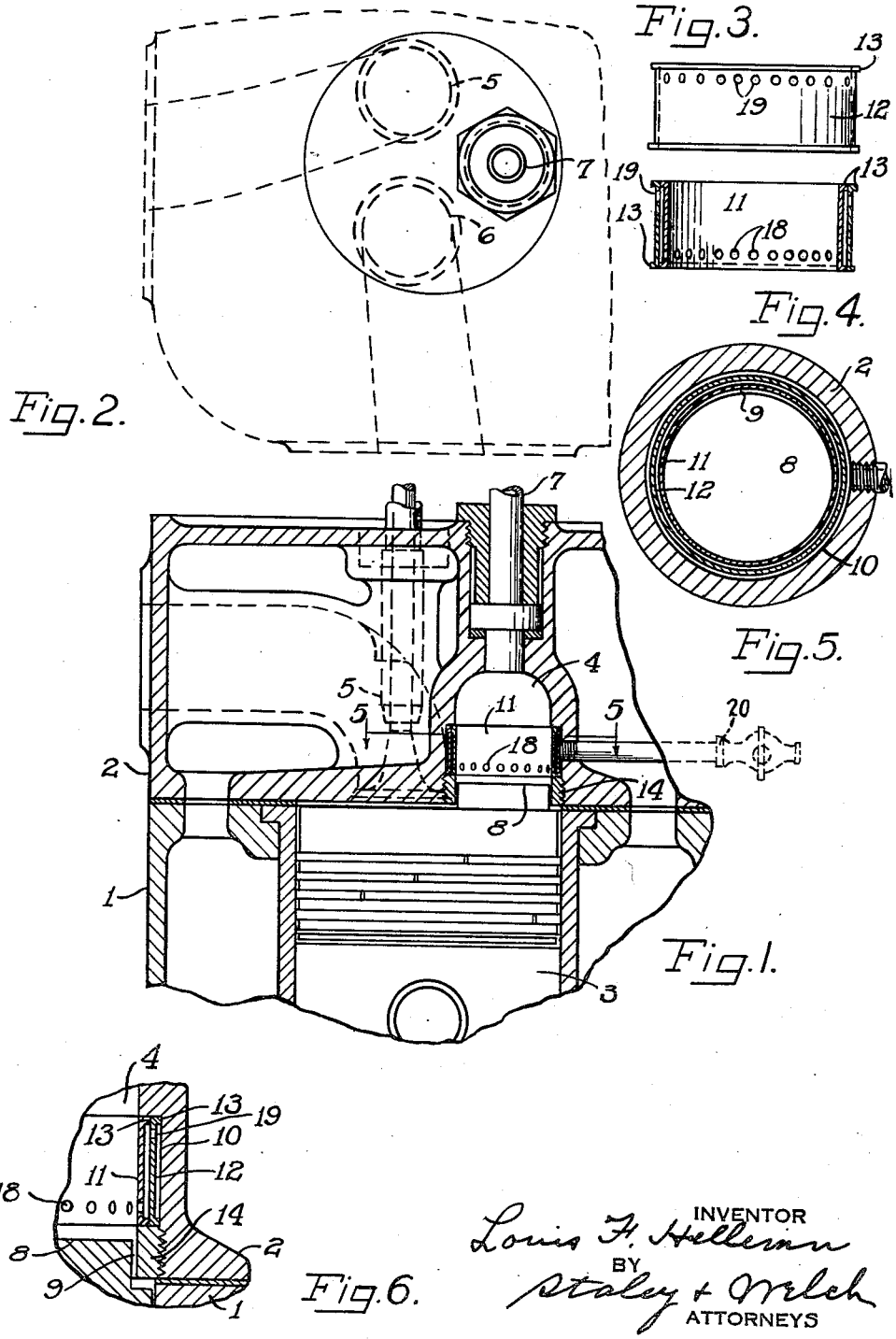

2,264,205

UNITED STATES PATENT OFFICE 2,264,205

INTERNAL COMBUSTION ENGINE

Louis F. Hellemn, Sherwood, Ohio

Application July 11, 1940, Serial No. 344,927

2 Claims. (Cl. 123—191)

This invention relates to internal combustion engines, it particularly relating to means for facilitating starting of the engine; the invention being intended particularly for engines of the Diesel type, although not necessarily limited to that particular type of engine.

An object of the invention is to facilitate starting of an internal combustion engine in an efficient manner.

A further object of the invention is to provide means to facilitate the starting of an internal combustion engine which is installed in a combustion chamber and located entirely in the cylinder head.

In the accompanying drawing:

Fig. 1 is a vertical section of a portion of the cylinder and its head showing the improvements.

Fig. 2 is a top plan view of a portion of the head of the cylinder.

Fig. 3 is a side elevational view of the outer ring of the heat accumulator.

Fig. 4 is a sectional view of both rings of the accumulator in assembled form.

Fig. 5 is a section on the line 5—5 of Fig. 1.

Fig. 6 is a partial vertical section of a portion of the piston, the head of the cylinder and the heat accumulator.

Referring to the drawing, I represents an engine cylinder of conventional form to the upper end of which is attached in any suitable way a head 2. In the present case the piston 3 moves on its up stroke to the extreme end of the cylinder I and a combustion chamber 4 is located entirely in the cylinder head. The cylinder head is provided with the usual air supply and exhaust valves 5 and 6 to permit air to be supplied to the upper end of the cylinder and thence to the combustion chamber and the products of combustion to be exhausted. The outer end of the head is provided with an injector 7 of any well known form for the purpose of injecting the fuel into the combustion chamber 4. The inner end of the combustion chamber is cylindrical in form and is adapted to receive a comparatively shallow plug 8 secured to the piston 3. A portion of this plug snugly fits into that portion of the wall of the combustion chamber formed by the bushing 14 and the other portion thereof is cut away to provide a restricted passage 9 extending throughout the height of the plug. This passage may be of any suitable form to give the desired result but is preferably of the form shown in the drawing in which a portion of the wall of the plug is cut away on the arc of a circle to provide a space which gradually reduces in width toward the sides thereof.

In the engine shown and described the charge is fired by compression ignition.

For the purpose of facilitating starting, the combustion chamber is provided with a structure to be now described. The chamber has an interior annular groove 10 extending thereabout in which are located inner and outer spaced-apart concentrically-arranged rings 11 and 12, the outer ring being also spaced from the inner wall of the groove. For the purpose of spacing the rings and spacing the inner ring from the wall of the combustion chamber, the edges of each ring near its periphery are thickened or provided with annular flanges 13, which also act to close the spaces at the peripheries of the rings. The structure is so disposed as to extend about the combustion chamber interiorly thereof and is closed at its inner and outer edges to the combustion chamber in the manner explained. Near its inner edge the inner ring 11 is provided with a series of ports 18 extending around the entire circumference thereof which communicate with the space between the two rings. Near the outer edge of the outer ring it is provided with a series of ports 19 extending about the entire circumference thereof and which communicate with the space between the outer ring and the wall of the combustion chamber. The spaces between rings and between the outer ring and the wall of the combustion chamber are of such radial width as to offer considerable resistance to flow of fluid about the rings through said spaces. In starting the engine cold it is turned over in the usual manner. In the compression stroke of the piston the air is forced through the ports 18 in the inner ring into the space between the rings and flows in the direction of the width of the rings, then passes through the ports 19 in the outer ring in the space between the outer ring and the wall of the combustion chamber and flows in the direction of the width of the outer ring. This air flows through the ports and between the rings and the wall of the combustion chamber under high pressure and high velocity.

By reason of the projecting plug 8 on the piston which enters the combustion chamber and has the restricted passageway leading from the combustion chamber to the cylinder proper the induction swirl of the fuel and turbulence after ignition of the fuel mixture can be definitely controlled so as to reduce the swirl and turbulence to the minimum and give a comparatively quiescent condition in the combustion chamber at the time of injection of the fuel, this being accomplished by relieving one side of the plug 8 which enters the combustion chamber in the cylinder head or otherwise restricting the passage therethrough so as to restrict the air flowing in all directions except as desired to give sufficient turbulence to provide a proper mixture. It has also been found that this restricted passage around the plug aids to a material extent in reducing the shock of combustion by retarding full firing pressure from the complete piston area until the proper crank angle is reached, at which time the plug has receded from the combustion chamber to permit the full piston area to be subjected to the expanding fuel mixture.

A drain cock 20 is preferably provided to drain the fluid from the space formed by the rings 11 when desired.

Having thus described my invention, I claim:

1. In an internal combustion engine, a cylinder, a combustion chamber opening into said cylinder, a piston, means for supplying combustible mixture to said chamber, and an element in said combustion chamber comprising inner and outer members, means to space said members apart and to also space the outer member from said combustion chamber to form spaces between said members and between the outer member and combustion chamber, said inner member being provided in proximity to its inner edge with a plurality of ports extending substantially about the entire circumference thereof, and said outer member being provided in proximity to its outer edge with a plurality of ports extending substantially about the entire periphery thereof.

2. In an internal combustion engine, a cylinder, a combustion chamber opening into said cylinder, a piston, means to supply a combustible mixture to said chamber, and an element in said combustion chamber comprising inner and outer spaced apart rings located in an annular groove in said chamber, said outer ring being spaced from the bottom wall of said groove, a series of ports in proximity to the inner edge of said inner rings, and a series of ports located in proximity to the outer edge of said outer ring, the ports in each ring extending substantially about the entire circumference of said rings.

LOUIS F. HELLEMN.